(12) United States Patent
Park et al.

(10) Patent No.: US 9,208,360 B2
(45) Date of Patent: Dec. 8, 2015

(54) RFID TAG FOR RFID SERVICE AND RFID SERVICE METHOD THEREOF

(75) Inventors: Chanwon Park, Daejeon (KR); Sewon Oh, Daejeon (KR); Gilyoung Choi, Daejeon (KR); Cheolsig Pyo, Daejeon (KR); Jongsuk Chae, Daejeon (KR); David Tschische, Klagenfurt (AT)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 347 days.

(21) Appl. No.: 12/996,227

(22) PCT Filed: Jun. 4, 2009

(86) PCT No.: PCT/KR2009/002979
§ 371 (c)(1),
(2), (4) Date: Dec. 3, 2010

(87) PCT Pub. No.: WO2009/148273
PCT Pub. Date: Dec. 10, 2009

(65) Prior Publication Data
US 2011/0084811 A1    Apr. 14, 2011

Related U.S. Application Data

(60) Provisional application No. 61/058,643, filed on Jun. 4, 2008.

(51) Int. Cl.
*G06K 7/00* (2006.01)
*G06K 7/10* (2006.01)

(52) U.S. Cl.
CPC .......... *G06K 7/0008* (2013.01); *G06K 7/10475* (2013.01)

(58) Field of Classification Search
CPC .......... G06F 17/30876; G06K 7/0008; G06Q 10/08; G07F 7/1008; G07C 9/0011; G07G 1/009; H04B 5/0062; H04L 2209/56; H04N 1/2156; H04Q 2209/47; H04W 88/02
USPC ....................................................... 340/10.1
See application file for complete search history.

(56) References Cited

U.S. PATENT DOCUMENTS

2004/0145474 A1    7/2004   Schmidtbert et al.
2006/0168644 A1    7/2006   Rickter et al.
(Continued)

FOREIGN PATENT DOCUMENTS

EP    1 916 546      4/2008
JP    2008-59013     3/2008
(Continued)

OTHER PUBLICATIONS

International Search Report mailed Sep. 24, 2010 in International Application No. PCT/KR2009/002979.
(Continued)

*Primary Examiner* — Brian Zimmerman
*Assistant Examiner* — Cal Eustaquio
(74) *Attorney, Agent, or Firm* — Staas Halsey LLP

(57) ABSTRACT

Disclosed are an RFID tag for an RFID service and an RFID service method thereof. The present invention includes a tag storage unit including a TID memory and a user memory; and a tag controller that inserts and stores a content name field including content name information related to an item attached with the corresponding tag in the user memory, wherein the tag controller inserts the content name information in a tag response signal according to the request of a peripheral RFID interrogator and transmits it or permits an access to the memory in which the content name field is inserted. The present invention includes and stores the content name information in the identification data stored in the RFID tag to allow a user to select only the desired tag when the interrogator simultaneously recognizes a plurality of tags and receive the desired contents through the network, making it possible to give convenience to a user and reduce time and the using fee of the network.

9 Claims, 14 Drawing Sheets

(56) References Cited

U.S. PATENT DOCUMENTS

| | | |
|---|---|---|
| 2007/0011269 A1 | 1/2007 | Jeon et al. |
| 2007/0194889 A1* | 8/2007 | Bailey et al. ............... 340/10.51 |
| 2007/0222597 A1* | 9/2007 | Tourrilhes et al. ......... 340/572.1 |
| 2007/0290815 A1* | 12/2007 | Delis ........................ 340/10.41 |
| 2008/0034183 A1 | 2/2008 | Drago et al. |
| 2008/0094183 A1 | 4/2008 | Fukushima et al. |
| 2008/0175390 A1* | 7/2008 | Alessio et al. ................ 380/278 |
| 2008/0196106 A1* | 8/2008 | Friedrich ........................ 726/27 |
| 2008/0284570 A1* | 11/2008 | Ryoo et al. .................... 340/10.1 |
| 2010/0001840 A1* | 1/2010 | Kang et al. .................... 340/10.1 |

FOREIGN PATENT DOCUMENTS

| | | |
|---|---|---|
| KR | 10-2006-0128339 | 12/2006 |
| KR | 10-0733986 | 6/2007 |
| KR | 10-0785771 | 12/2007 |

OTHER PUBLICATIONS

Schwieren et al., "Implementing Physical Hyperlinks for Mobile Applications Using RFID Tags", $11^{th}$ International Database Engineering and Applications Symposium (IDEAS 2007), 10 pp.

"EPCglobal Tag Data Standards Version 1.3", EPCglobal, Mar. 8, 2006, pp. 1-97.

"EPC™ Radio-Frequency Identity Protocols Class-1 Generation-2 UHF RFID Protocol for Communication at 860 MHz-960 MHz Version 1.1.0", EPCglobal, Specification for RFID Air Interface, Dec. 17, 2005, pp. 1-100.

* cited by examiner

Figure 9

| Bit order | Upper address | Lower address | | |
|---|---|---|---|---|
| | 31 : 16 | 15 : 14 | 13 | 12 : 0 |
| Name | Start Pointer[15:0] | MB[1:0] | XPC_W1[211h] | RFU |
| description | START ADDRESS OF Content_name FIELD | STORAGE LOCATION (ex:Memory bank) | PRESENCE/ABSENCE OF CONTENT NAME DATA IN Content_name FIELD | Reserved |
| # of bit | 16 | 2 | 1 | 13 |

RFID TAG FOR RFID SERVICE AND RFID SERVICE METHOD THEREOF

CROSS REFERENCE TO RELATED APPLICATIONS

This application claims the benefit of International Application No. PCT/KR2009/002979, filed Jun. 4, 2009, and claims the benefit of U.S. Provisional Application No. 61/058,643, filed Jun. 4, 2008, the disclosures of all of which are incorporated herein by reference.

TECHNICAL FIELD

The present invention relates to an RFID tag for an RFID service and an RFID service method thereof, and in particular, to an RFID tag for an RFID service capable of providing contents by allowing a user to selected only desired tags when the RFID interrogator recognizes a plurality of RFID tags, including content name information in identification data stored in the RFID tag and an RFID service method thereof.

BACKGROUND ART

An RFID identifies an RFID tag attached to an object by using a wireless signal and processes information stored in the RFID tag, which is used for various application services (process management, distribution, settlement, medical service, security, and the like). With the development of the RFID technology, the RFID tags and the corresponding RFID recognizers have variously been developed.

Generally, the RFID tag is read by wireless communication with a fixed RFID interrogator. At this time, the RFID tag provides an identification code, such as mCode or unique item identifier (UII) that is processed by an infrastructure of the RFID interrogator, to the RFID interrogator, such that the RFID interrogator identifies the corresponding RFID tag.

Recently, as the use of service using the RFID is increased, the RFID is being applied to almost all fields and is being applied with a variety of new application technologies. A mobile RFID handheld device has been used as a technology for providing a ubiquitous environment to a user.

The fixed RFID interrogator first reads the ID of the RFID tag. Thereafter, the fixed RFID interrogator accesses an object directory service (ODS) server to search a web address of a contents provider and accesses a contents providing server that is searched from the ODS server. Meanwhile, the contents providing server provides information, such as contents, etc., to use detailed information about goods, audio contents, video contents, online paying function, and the like, to a mobile phone of a user, that is, a mobile phone to which the RFID tag is attached.

The mobile RFID interrogator (or a handheld device in which the mobile RFID interrogator is integrated) has a service infrastructure based on the ODS. Therefore, the mobile RFID interrogator should be implemented by a protocol stack that can exchange information with the ODS server in order to access the ODS server that provides information on interested goods in a mobile environment.

In addition, except for the uniform resource identifiers (URIs) previously included in the mobile device, the ODS server needs to be permanently reachable to the following requirements.

When reading several different tags at one time, all the tags are subjected to address resolution via the ODS server, such that time to access the ODS server is long and an end user (real user) should wait for a long time.

Moreover, mobile phone providers can charge for the use of ODS through a wired or wireless network or for packet transmission of data through their wireless or wired networks, if necessary, in order to process the address resolution.

DISCLOSURE

Technical Problem

In order to solve the above problems, it is an object of the present invention to provide an RFID tag for an RFID service capable of easily identify an item attached with the corresponding RFID tag by storing content name information in identification data stored in the RFID tag and an RFID service method thereof.

In addition, it is another object of the present invention to provide an RFID tag for an RFID service simultaneously obtaining content name information of an item from a tag to select only desired item and then receiving the content through a network and an RFID service method thereof, when the user uses the RFID interrogator to recognize the plurality of RFID tags.

Technical Solution

In order to achieve the objects, there is provided an RFID tag for an RFID service according to the present invention, including: a tag storage unit including a TID memory and a user memory; and a tag controller that inserts and stores a content name field including content name information related to an item attached with the corresponding tag in the user memory, wherein the tag controller inserts the content name information in a tag response signal according to the request of a peripheral RFID interrogator and transmits it or permits an access to the memory in which the content name field is inserted.

The tag storage unit stores a unique item identifier (UII) as an item identification data for the item to which the corresponding RFID tags are attached.

The tag controller inserts and stores the content name field in a memory bank having a predefined address in the user memory.

The tag controller inserts the content name fields in the memory bank having any address in the user memory and stores the positional information of the memory bank, in which the content name field is inserted, in the TID memory.

The content name field includes a data field in which the content name data is stored and a data length field in which length information on the data field is stored.

The data field is continuously inserted in the back of the data length field.

The length of the data field is a character size of the content name data included in the data field and the character size is stored in a byte unit.

The character included in the data field is prepared in an ASCII CODE type.

The tag code memory includes a first memory bank in which a storage location is recorded, the storage location being inserted with the presence or absence of the corresponding content name field and a second memory bank that is continued to the first memory bank and is recorded with a start address of the content name field.

When the tag controller receives a first ACK instruction from the RFID interrogator, it transmits the address information of the user memory bank in which the content name field is inserted or the TID memory bank in which the positional information of the content name field is stored to the RFID interrogator.

When the tag controller receives a second ACK instruction from the RFID interrogator, it inserts and transmits the content name field including the content name data in the response signal.

The response signal includes an extended protocol control (XPC) field, wherein a content name indicator indicating whether there is the content name field is included in a predetermined field of the extended protocol control.

The content name field is inserted in the back of the UII included in the response signal.

In order to achieve the above objects, there is provided an RFID service method of an RFID tag, including: inserting and storing a content name field including content name information related to an item attached with the corresponding RFID tag in any one of a TID memory and a user memory; after receiving a first ACK instruction from peripheral RFID interrogators, transmitting address information of a user memory bank in which the content name field is inserted or a TID memory bank in which the positional information of the content name field is inserted to the RFID interrogator according to a read instruction from the RFID interrogator; and allowing to be accessed the RFID interrogator to the memory bank in which the content name field is inserted according to the request of the RFID interrogator.

The storing includes inserting the content name data in the data field of the content name field and inserting the length information of the data field in a data length field.

The RFID service method further includes extracting the item identification data (UII) from the EPC memory in which the item identification data (UII) is stored and inserting and transmitting it in the response signal to the first ACK instruction when receiving the first ACK instruction from the RFID interrogator.

The storing further includes inserting the content name field in the memory bank having any address in the user memory and storing the positional information of the memory bank, in which the content name field is inserted, in the TID memory.

The storing inserts and stores the content name field in the memory bank having the predefined address in the user memory.

In order to achieve the above objects, there is provided an RFID service method of an RFID tag, including: inserting and storing a content name field including content name information related to an item attached with the corresponding RFID tag in any one of a tag code memory and a user memory; receiving a second ACK instruction from peripheral RFID interrogators, extracting the item identification data (UII) and the content name information and inserting them in the response signal to the second ACK instruction; and transmitting the response signal, in which the item identification data and the content name field information are inserted, to the RFID interrogator.

The RFID service method further includes inserting the eXtended protocol control (XPC) field including the content name indicator indicating whether there is the content name field in the response signal.

Advantageous Effects

The present invention includes the content name information in the identification data stored in the RFID tag and stores it, thereby easily identifying the item attached with the corresponding RFID tag.

Further, the present invention can confirm content names related to the plurality of RFID tags without accessing the ODS server, such that it can easily select the RFID tag attached to the specific item among the plurality of RFID tags.

In addition, the present invention does not request all the RFID tag information on the plurality of RFID tags from the ODS server and can request information related to only the RFID tag selected based on the content name information, thereby making it possible to reduce time required to connect to the ODS server.

DESCRIPTION OF DRAWINGS

FIGS. 5 to 9 are exemplary diagrams showing an embodiment of content name data in the RFID tag according to the present invention.

BEST MODE

Hereinafter, exemplary embodiments of the present invention will be described with reference to the accompanying drawings.

The present invention proposes an apparatus and a method that can confirm content name information related to an item attached with peripheral RFID tags without an RFID interrogator accessing an ODS server by recording content name information related to an item attached with the corresponding RFID tag in an RFID tag operating under an RFID environment in a ultrahigh frequency (UHF) band.

MODE FOR INVENTION

Figure 1:
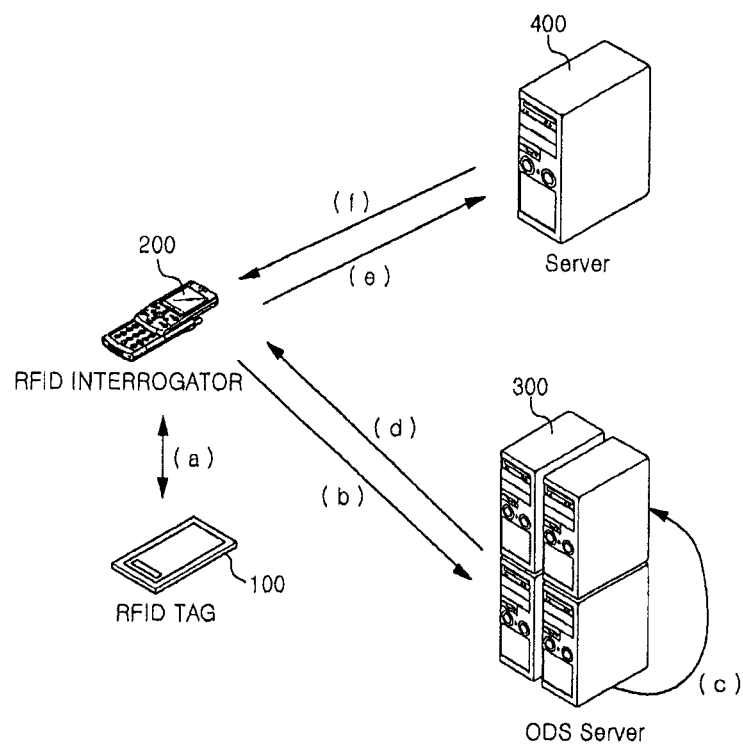
FIGS. 1 and 2 are system configuration diagrams referenced for explaining an RFID service method according to the embodiment of the present invention.

FIG. 1 is a diagram showing an entire system configuration for a mobile RFID service according to an embodiment of the present invention.

As shown in FIG. 1, the RFID service system according to one embodiment of the present invention includes an RFID tag 100, an RFID interrogator 200, an ODS server, 300, and a server 400.

A RFID tag 100 includes a user memory, a TID memory (Tag-ID memory), etc. Herein, the user memory is a nonvolatile memory. The user memory stores unique identification information that is given to each of the corresponding tags.

In addition, the user memory is recorded with identification information on an item to which the corresponding RFID tag 100 is attached, for example, a unique item identifier (UII). At this time, the RFID tag 100 transmits the tag information recorded in the user memory by using wireless frequency radio, in (a) of FIG. 1. Therefore, an RFID interrogator 200 recognizes the corresponding RFID tag 100 from a unique identification number that is included in a tag response from the RFID tag 100.

Further, the user memory of the RFID tag 100 stores the content name data related to the item to which the corresponding tag is attached. Therefore, when the RFID tag 100 receive a request from the RFID interrogator 200, it carries a UII stored in the user memory, the content name information, etc., on the response signal and transmits it to the corresponding RFID interrogator 200.

The RFID interrogator 200 identifies the corresponding RFID tag 100 from the UII included in the tag response of the RFID tag 100 and confirms the content name related to the item attached with the corresponding RFID tag 100 from the content name information. Therefore, the RFID interrogator 200 access the ODS server to recognize the content name information related to the item to which the corresponding RFID tag is attached before requesting the information related to the corresponding RFID tag (100).

Thereafter, the RFID interrogator 200 receives the contents related to the corresponding item through processes (b) to (f) of FIG. 1.

Meanwhile, even though the RFID tag 100 does not transmit the corresponding item related information to the RFID interrogator 200, the RFID interrogator 200 is inventoried with the RFID tag 100 and then accesses the corresponding RFID tag 100, making it possible to search the corresponding item related information, such as UII and content name.

Figure 2:
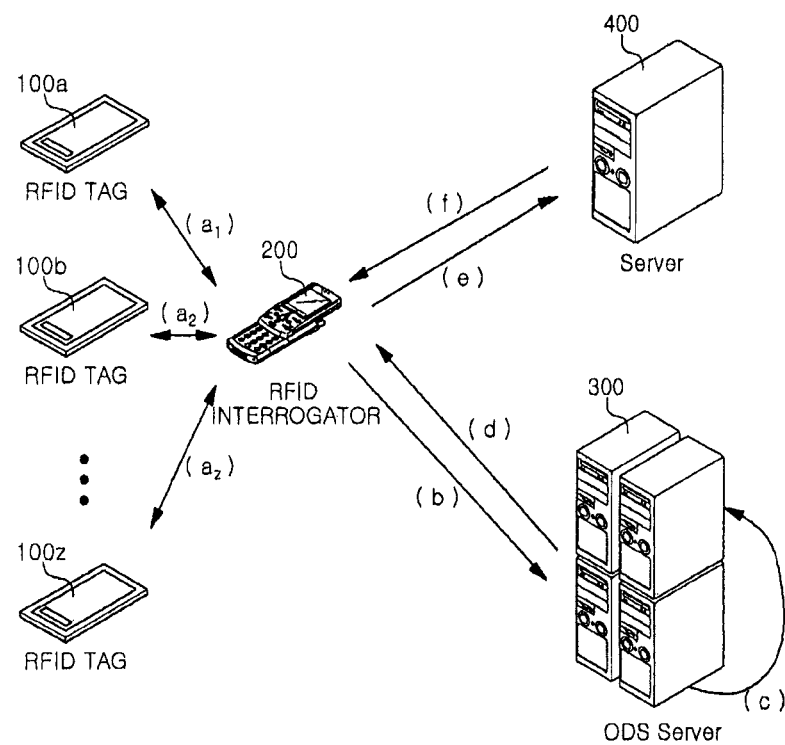

Meanwhile, FIG. 2 is a diagram showing another embodiment of FIG. 1. At this time, the RFID interrogator of FIG. 2 recognizes the RFID tag information and the operational process of receiving the related contents is the same as FIG. 1. However, FIG. 2 shows a case where a plurality of RFID tags 100a, 100b, . . . , 100z are positioned near the RFID interrogator 200. In this case, each of the RFID tags 100a, 100b, . . . , 100z performs each operation of the RFID tag 100 described in FIG. 1.

The detailed configuration of the RFID tag 100 will be described in detail with reference to FIG. 3.

The RFID interrogator 200 transmits the control signal having an ultrahigh frequency (UHF) band to the RFID tag 100 through (a) of FIG. 1, thereby receiving the response signal from the peripheral RFID tag 100.

When the response signal includes the information related to the RFID tag 100, that is, the UII and the content name information, the RFID interrogator 200 reads the response signal received from the RFID tag 100 to extract the information, such as UII, content name information, etc. At this time, the RFID interrogator 200 recognizes the information on the item attached with the RFID tag 100 from the UII included in the response signal and recognizes the content name information related to the item attached with the corresponding RFID tag 100.

Meanwhile, the RFID interrogator 200 receives the UII and the content name information from the plurality of RFID tags 100a, 100b, . . . , 100z through processes $(a_1), (a_2), \ldots, (a_z)$ of FIG. 2 in the case where the plurality of RFID tags 100a, 100b, . . . , 100z are positioned near the RFID interrogator 200 shown in FIG. 2. At this time, the RFID interrogator 200 further provides the operation of selecting any one RFID tag 100 based on the content name information provided from the plurality of RFID tags 100a, 100b, . . . , 100z.

In this case, the RFID interrogator 200 can immediately confirm the content name without confirming the information relating to the RFID tag of each of the plurality of RFID tags 100a, 100b, . . . , 100z from the ODS server. Therefore, the RFID interrogator 200 can easily select the corresponding RFID tag 100, in detail, the UII of the corresponding RFID tag 100 based on the content name information.

On the other hand, when the information, such as UII, content name information, etc., is stored in the tag list of the RFID tag 100, the RFID interrogator 200 is inventoried with the RFID tag 100 and then accesses the RFID tag 100. At this time, the RFID interrogator 200 searches the tag storage stored in the user memory of the RFID tag 100 to obtain the information, such as UII, content name information, etc.

The RFID interrogator 200 reads the UII and the content name information obtained from the RFID tag 100 to recognize the information of the item attached with the RFID tag 100 from the UII. Further, the RFID interrogator 200 recognizes the content name information related to the item to which the corresponding RFID tag 100 is attached.

The detailed embodiment of a method for providing the content name information from the RFID tag 100 to the RFID interrogator 200 will be described with reference to FIGS. 5 to 8.

The RFID interrogator 200 requests the corresponding RFID tag 100 information from a server 400 providing the content to the ODS server 300, based on the item information and the content name information recognized from the UII (see (b) of FIGS. 1 and 2) and receives the related RFID tag 100 information from the corresponding ODS server 300 (see (d) of FIGS. 1 and 2). Further, The RFID interrogator 200 confirms the positional information of the contents server providing the corresponding item related contents based on the RFID tag 100 information provided from the ODS server 300. The RFID interrogator 200 accesses the confirmed contents server (see (e) of FIGS. 1 and 2) to receive the related contents from the corresponding server 400 (see (f) of FIGS. 1 and 2).

The detailed configuration of the RFID tag 200 will be described in detail with reference to FIG. 4.

The ODS server 300 provides data necessary to obtain information resources through a network. In most cases, the ODS server 300 is configured of a hierarchical structure.

First, the ODS server 300 receives the signals requesting the information related to the RFID tag from the RFID interrogator 200. At this time, the received signal includes the RFID tag identification information, that is, the UII provided from the corresponding RFID tag 100.

At this time, the ODS server 300 analyzes the UII received from the RFID interrogator 200, extracts the RFID tag information corresponding to the corresponding identification information (see (c) of FIGS. 1 and 2), and transmits the extracted information to the RFID interrogator 200 (see (d) of FIGS. 1 and 2).

Therefore, the RFID interrogator 200 obtains item related information attached with the corresponding RFID tag corresponding to the UII from the ODS server 300. Thereby, the RFID interrogator 200 requests the related contents to the server 400 providing the corresponding contents, based on the information obtained from the ODS server 300 and receives the contents related to the item to which the corresponding RFID tag 100 is attached (see (e) and (f) of FIGS. 1 and 2).

Meanwhile, the server 400 is a contents server in which the contents related to the item attached with the RFID tag 100 are stored. At this time, the server 400 stores each content to be corresponded to the UII in relation to the item to which the RFID tag 100 is attached.

The server 400 may be implemented by one server or a plurality of servers. Also, the server 400 may be implemented by a domain name service (DNS) server form. Of course, the above-mentioned server 400 is a contents server as one embodiment, but may be a server in which the information related to the item attached with the corresponding RFID tag 100 in addition to the contents server is recorded and may be a proxy server for accessing the related server or the contents server.

The following embodiment will be described with reference to the contents server represented by reference numeral '400'.

Figure 3:
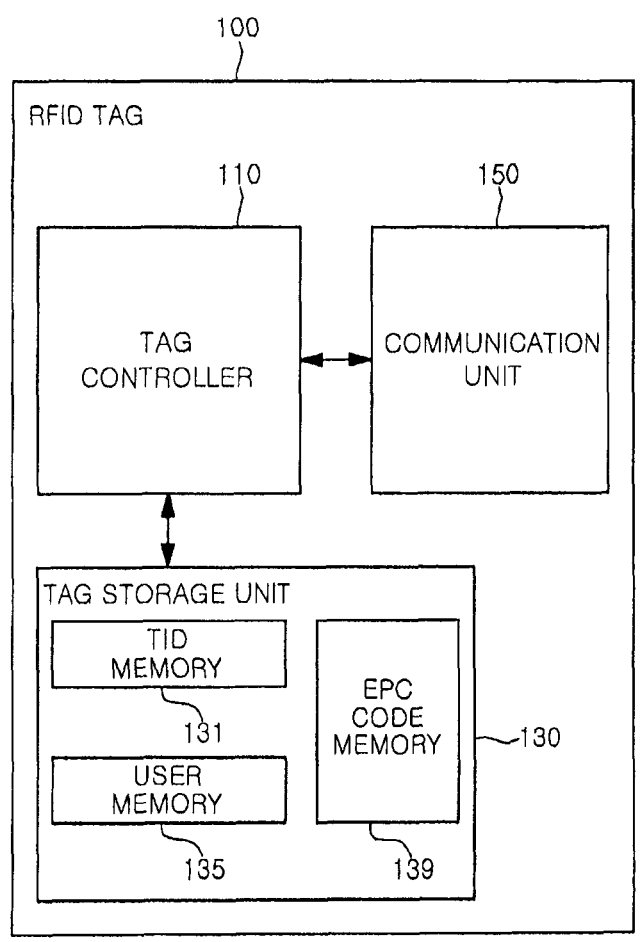
FIG. 3 is a block diagram showing a configuration of the RFID tag according to the embodiment of the present invention.

FIG. 3 is a block diagram for describing a configuration of the RFID tag according to the embodiment of the present invention.

Referring to FIG. 3, the RFID tag 100 according to the present invention includes a tag controller 110, a tag storage unit 130, and a communication unit 150.

First, the tag storage unit 130 stores the item identification data including the item information to which the corresponding RFID tag 100 is attached and the content name (Content_name) data including the contents resource information on the item to which the corresponding RFID tag is attached.

Hereinafter, an example that the item identification data is the unique item identifier (UII) will be described.

The tag controller 110 provides the UII and the content name data stored in the tag storage unit 130 according to the request of the peripheral RFID interrogator 200 to the corresponding RFID interrogator 200 or permits the access of the corresponding RFID interrogator 200 to the tag storage unit 130. In detail, the tag controller 110 permits the access of the user memory 135 to the tag storage unit 130.

As one embodiment, in the inventory process between the RFID tag 100 and the RFID interrogator 200, when the RFID tag 100 receives the second ACK instruction from the RFID interrogator 200, the tag controller 110 includes all the UIIs and content name data, which are stored in the tag storage unit 130, in the response signal and then transmits them.

When the tag controller 100 includes the content name data in the response signal to the second ACK instruction from the RFID interrogator 200 and then transmits them, it inserts the content name data in the back of the UII included in the response signal. At this time, the tag controller 110 can continuously insert the content name data and the UII.

According to another embodiment, in the inventory process between the RFID tag 100 and the RFID interrogator 200, when the RFID tag 100 receives the first ACK instruction from the RFID interrogator 200, the tag controller 110 includes only the UII, which is stored in the tag storage unit 130, in the response signal and transmits it. Thereafter, the tag controller 110 permits the access of the corresponding RFID interrogator 200 to the tag storage unit 130 by the read instruction, etc. from the RFID interrogator 200.

Meanwhile, the tag storage unit 130 includes a tag code memory (tag ID memory, hereinafter, referred to as TID memory) 131 in which the RFID tag code is stored, a non-volatile user memory 135 that can be accessed by the RFID interrogator 200, and an EPC code memory (hereinafter, referred to as 'EPC' memory) 139. Herein, the code includes mCode, EPC code, micro mCode. Etc.

An indicator, which can confirm whether there is the content name field, is stored in the memory bank of the TID memory 131. A content data length field including the content name data and the length information thereon is stored in the memory bank of the user memory 135.

Meanwhile, a memory bank of an EPC memory 139 is referred to as an UII memory bank. At this time, a PC field, an XPC field, and a code (UII) are stored in the memory bank of the EPC memory 139.

Of course, the tag storage unit 130 may further include a reserved memory bank, etc., that can be used later. This is omitted in the figure.

The tag controller 110 inserts the content name data in the user memory 135 and stores them thereon. In detail, the tag controller 110 inserts the content name field (Content_name field) including the content name data on the tag list of the user memory 135 and stores them thereon. At this time, the tag controller 110 inserts the corresponding content name field in a memory bank having a predefined address. The detailed embodiment thereof will be described with reference to FIG. 6.

Meanwhile, the tag controller 110 can insert the data length field including the length information of the corresponding content name field. At this time, the data length field is inserted in front of the content name field and the content name field is inserted subsequent to the data length field. The data length field is necessarily inserted when the content name field is inserted. Therefore, the data length field may be included in the content name field.

Meanwhile, when the tag controller 110 inserts the content name field in the user memory 133, it can insert it in the memory bank having any address. In this case, the tag controller 110 stores a content name address pointer for the content name field at a fixed position on the TID memory 131.

Herein, the address information of the memory bank inserted with the content name field is stored in the content name address pointer. However, the content name field starts from the data length field, such that the address information of the memory bank inserted with the data length field is stored. The detailed embodiment thereof will be described with reference to FIGS. 7 and 8.

The communication unit 150 provides the information stored in the tag storage unit 130 to the RFID interrogator 200 through the communication with the RFID interrogator 200.

Figure 4:
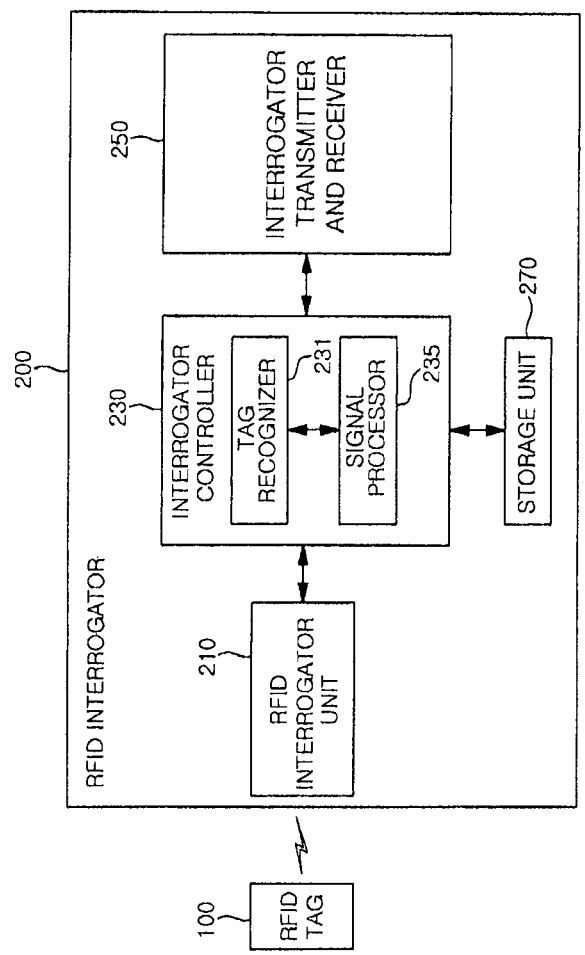
FIG. 4 is a block diagram showing a configuration of the RFID interrogator according to the embodiment of the present invention.

FIG. 4 is a block diagram for describing a configuration of the RFID tag according to the embodiment of the present invention.

As shown in FIG. 4, the RFID interrogator 200 according to the present invention includes a tag interrogator unit 210, an interrogator controller 230, an interrogator transmitter and receiver 250, and a storage unit 270.

The tag interrogator unit 210 is a unit that transmits and receives a signal to and from the RFID tag 100 and transmits the control signal having an ultrahigh frequency (UHF) band to the RFID tag 100 according to the control instruction from the interrogator controller 230. Likewise, the tag interrogator unit 210 receives a response signal from the RFID tag 100.

For example, a tag interrogator unit 210 transmits the first ACK instruction to the peripheral RFID tag 100 according to the control instruction from the interrogator controller 230. At this time, the tag interrogator unit 210 receives the first tag response corresponding to the first ACK instruction. Meanwhile, the tag interrogator unit 210 transmits the second ACK instruction to the peripheral RFID tag 100 according to the control instruction from the interrogator controller 230. At this time, the tag interrogator unit 210 receives the second tag response corresponding to the second ACK instruction.

The interrogator controller 230 controls the operations of each unit in the RFID interrogator 200. In particular, the interrogator controller 230 controls the tag interrogator unit 210 to control the operation of transmitting and receiving a signal to and from the RFID tag 100 and controls the operation of the interrogator transmitter and receiver 250 to control the signal transmission and reception with the ODS server 300, the contents server 400, etc.

Meanwhile, the interrogator controller 230 includes a tag recognizer 231 and a signal processor 235. The tag recognizer 231 reads the response signal of the RFID tag 100 received through the tag interrogator unit 210 and recognizes the information included in the corresponding response signal. For example, the tag recognizer 231 reads the response signal of the RFID tag 100 to extract the UII and the content name data. The tag recognizer 231 recognizes the item information attached with the corresponding RFID tag 100 from the extracted UII and the content name information related to the corresponding item from the content name data.

The signal processor 235 stores the information recognized by the tag recognizer 231 in the storage unit 270. Also, the signal processor 235 access the ODS server 300 and requests the information on the contents server 400 related to the corresponding RFID tag 100, for example, the positional information of the contents server 400, based on the information recognized by the tag recognizer 231. The signal processor 235 recognizes the position of the contents server 400 that provides the corresponding item related contents from the information provided from the ODS server 300.

Meanwhile, the signal processor 235 attempts to access the contents server 400 through the interrogator transmitter and receiver 250. At this time, the signal processor 235 transmits the request signal for the item related contents attached with the corresponding RFID tag 100 to the contents server 400. Meanwhile, when the contents are received from the contents server 400 through the interrogator transmitter and receiver 250, the signal processor 235 stores the received contents in the storage unit 270.

The interrogator transmitter and receiver 250 includes a communication interface to transmit and receive a signal to and from the ODS server 300 and the contents server 400 according to the request of the signal processor 235. Of course, the interrogator transmitter and receiver 250 can transmit and receive a signal to and from other servers in addition to the contents server 300 and the contents server 400.

The storage unit 270 stores the UII and content name information of the RFID tag 100. Therefore, when the interrogator controller 230 receives the specific item related contents later, it can receives the related contents from the UII and the content name information corresponding to the UII, which are stored in the storage unit 270, without attempting to connect to the peripheral RFID tag 100 one by one.

Figure 5:
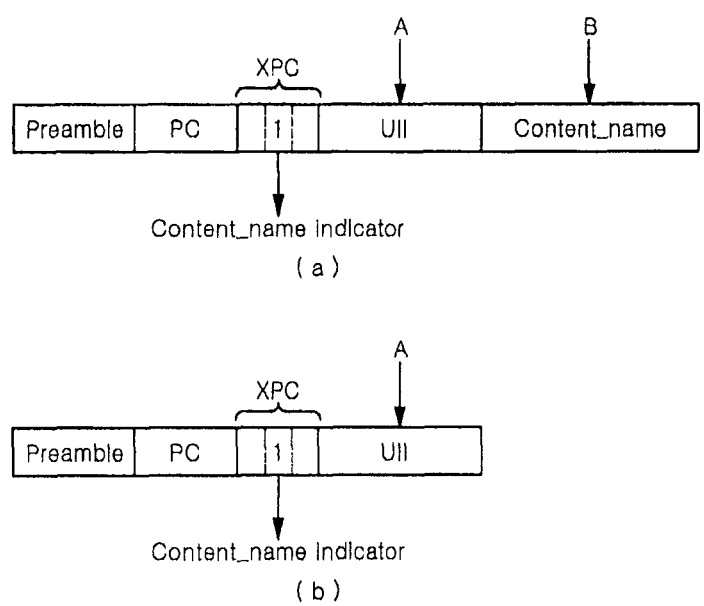
Figure 6:
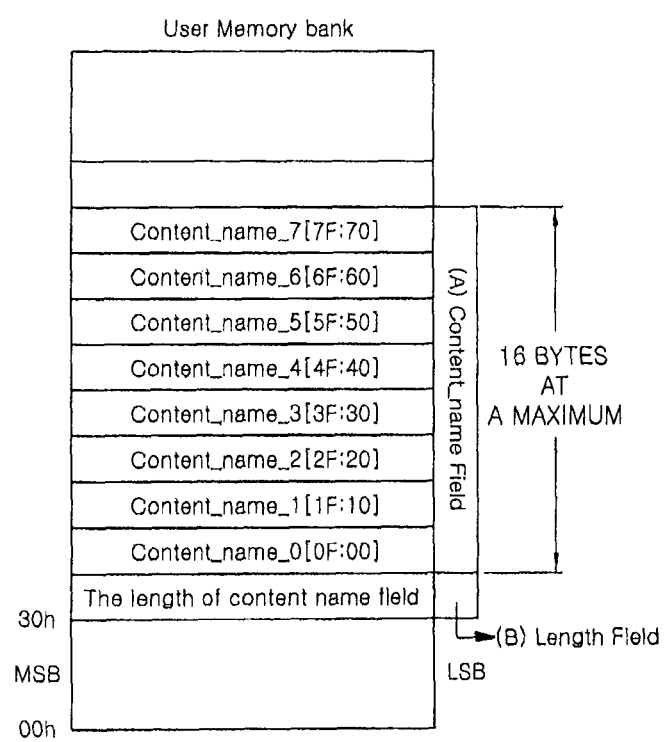
Figure 7:
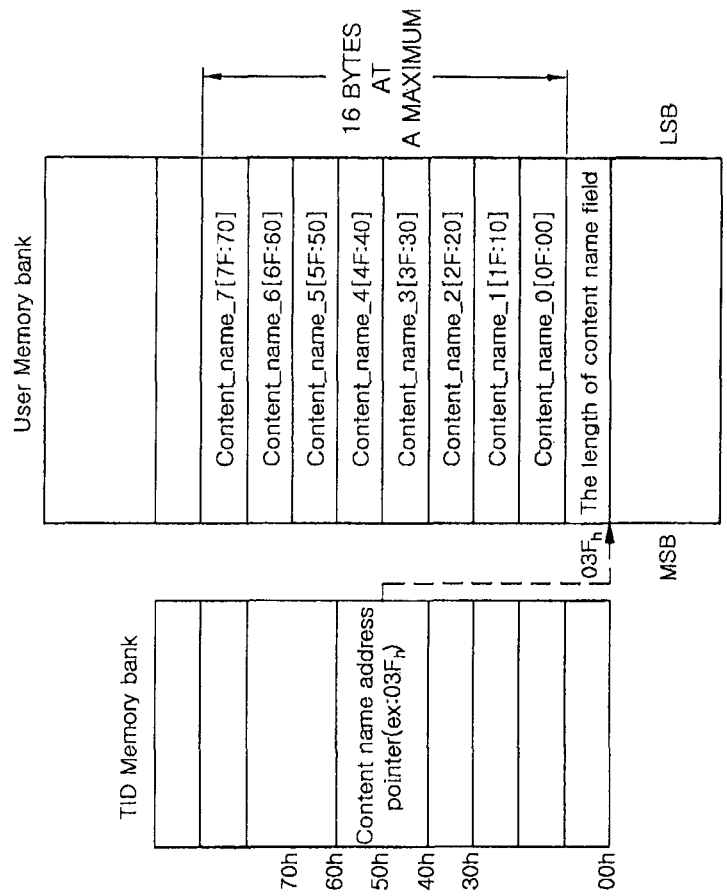
Figure 8:
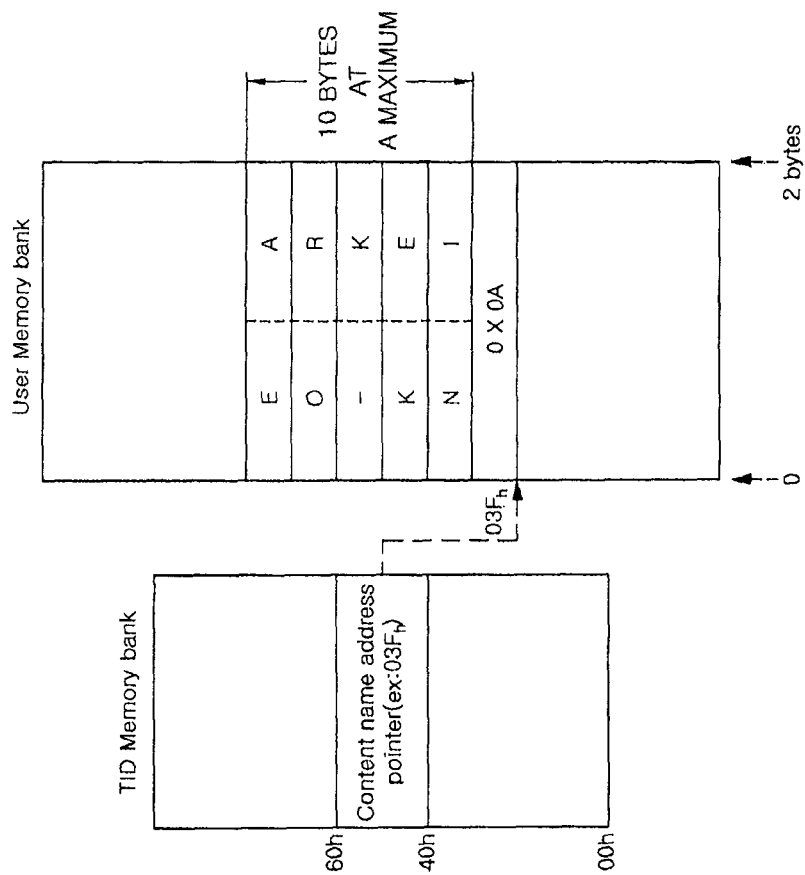

FIGS. 5 to 8 are exemplary diagrams showing a form that the tag related information is provided by the RFID tag. In particular, FIG. 5 shows an embodiment that inserts the tag related information in the tag response signal transmitted from the RFID tag to the RFID interrogator and transmits it and FIGS. 6 and 8 shows an embodiment that stores the tag related information in the user memory from the RFID tag to provide the tag related information to the corresponding RFID interrogator.

A method for inserting the content name field in the response signal to the instruction of the RFID interrogator 200 will be described by being largely divided into two.

A first method is a method for inserting the content name field in a bit stream of the response signal transmitted from the RFID tag 100 to the RFID interrogator 200 as shown in FIG. 5(a).

The response signal transmitted from the RFID tag 100 to the RFID interrogator 200 is recorded with a preamble, a protocol control (PC), an eXtended protocol control (XPC), etc.

A preamble field is recorded with information informing a start of a protocol message. The protocol control (PC) filed is recorded with a protocol control bit and the eXtended protocol control (XPC) field is recorded with an additional protocol control bit. The XPC field is represented so that the RFID interrogator 200 can discriminate a simple sensor from a complete function sensor.

The XPC can indicate the content name indicator, which can confirm whether there is the content name field. In other words, as shown in FIG. 5(a), the XPC can indicates that after receiving the second ACK instruction from the RFID interrogator 200, the Content_name field subsequent to the UII is inserted and is transmitted. Further, as shown in FIG. 5(b), the XPC can indicates that after receiving the first ACK instruction from the RFID interrogator 200, the content name field exists in the user memory bank of the RFID tag 100.

In addition, in the response signal, the UII information, which is the identification data for identifying the item attached with the RFID tag 100, is inserted in the UII field A.

Further, the RFID tag 100 inserts the URI content name field B recorded with the content name information in the bit stream transmitted to the RFID interrogator 200 in order to provide the content name information related to the corresponding item and transmits it. Of course, the content name field is inserted in the response signal only when receiving the second ACK instruction from the RFID interrogator 200.

FIG. 5 shows a tag response according to the embodiment of the present invention, and more specifically, shows a tag response according to ISO/IEC 18000-6 Type C air interface. At this time, FIG. 5 is an exemplary diagram showing the tag response including the UII and the content name data and does not show the subsequent CRC.

Herein, the content name field is one part of the response to the instruction of the RFID interrogator 200 and is back-scattered by the RFID tag 100. For example, in the case of ISO/IEC 18000-6 Type C, the content name field is provided subsequent to the UII and is inserted in the bit stream transmitted from the RFID tag 100 to the RFID interrogator 200. At this time, the content name field can be automatically added to the response signal of the RFID tag 100 by the request of the RFID interrogator 200 used only as a control flag.

Moreover, unless the content name field is limited by the air interface specification, it can be stored anywhere if there is the memory space usable in the tag. In the case of the UHF RFID tag 100 according to ISO/IEC 18000-6 Type C or EPCglobal Class-1 Generation-2, the user memory bank 112 may be an optimal space to store the content name field.

In this case, the RFID interrogator 200 accesses the user memory of the RFID tag 100, making it possible to read data.

When the Content name field is added as default to the RFID tag response to the request of the RFID interrogator 200, the content name field is continuously inserted subsequent to the UII field.

At this time, bits of each content name data included in the content name field can be formed by being allocated to Extended Protocol Control (XPC) words defined in ISO/IEC 18000-6 Revision 1.

Therefore, the RFID interrogator 200 can recognize the content name information related to the corresponding item from the content name data that is inserted in the content name field of the RFID tag response. Thereby, even though the RFID interrogator 200 receives the plurality of UIIs and the content name information from the plurality of RFID tags 100a, 100b, . . . , 100z that are positioned near the RFID interrogator 200, the RFID interrogator 200 can confirm the content name information related to the item attached with the plurality of RFID tags 100a, 100b, . . . , 100z before it access the ODS server 300. In this case, the RFID interrogator 200 can easily select the RFID tag 100 corresponding to the specific content name among the plurality of RFID tags 100a, 100b, . . . , 100z.

Therefore, the RFID interrogator 200 does not confirm the information on the plurality of RFID tags 100a, 100b, . . . , 100z from the ODS server 300 one by one and should confirm only the information of the selected RFID tag 100. Therefore, the RFID interrogator 200 access the contents server 400 providing the corresponding content resource to receive the related contents.

A second method is a method for inserting the content name field in the user memory bank as shown in FIGS. 6 and 8. At this time, the RFID tag 100 records the positional information of the memory in which the content name field is recorded, for example, a memory bank position, a memory address, a range, etc.

Herein, the RFID tag 100 can insert the content name field using the fixed address and range of the memory bank as shown in FIG. 6 and as shown in FIGS. 7 and 8, inserts the content name field in the memory bank having a specific address and can then record the positional information such as the start address of the memory bank inserted with the content name field, in a tag ID memory (TID memory) bank.

The RFID interrogator 200 transmits the first ACK instruction and the RFID tag 100 and the RFID tag 100 transmits the tag response including the UII information to the corresponding RFID interrogator 200 in response to the first ACK instruction, such that the RFID tag 100 and the RFID interrogator 200 are inventoried.

Thereafter, the RFID interrogator 200 transmits the read instruction to the RFID tag 100 and the RFID tag 100 carries the address information of the memory bank inserted with the content name field according to the request of the RFID interrogator 20 and transmits it to the corresponding RFID interrogator 200.

At this time, the RFID interrogator 200 accesses the RFID tag 100 according to a procedure provided by the RFID air interface, making it possible to access the content name field stored in the user memory according to the address information included in the tag response.

Of course, the RFID interrogator 200 can directly access the content name field, but indirectly access the content name field through the TID memory, etc. Therefore, the RFID interrogator 200 accesses the RFID tag 100 to read the content name field from the fixed address of the memory bank or confirm the position of the memory bank recorded with the content name field from the TID memory 131 and reads the content name field at the corresponding position of the user memory 133. At this time, each embodiment of the method for accessing the content name field will be described with reference to FIGS. 6 and 7.

FIG. 6 is an exemplary diagram showing an example where the content name field is stored in the memory bank having the predefined address. Referring to FIG. 6, the content name data from 'content_name_0' to 'content_name_N' is sequentially stored in the content name field according to a start sequence.

Herein, the content name is a name of the item to which the corresponding RFID tag 100 is attached and the corresponding content name is recorded in an ASCII CODE type. Meanwhile, the content name field is classified into the data field A in which the content name data is stored and the data length field B in which the length information of the corresponding data field A is stored. At this time, the data field A of the content name field can store the content name corresponding to 16 bytes at a maximum. The data length field B is recorded with the length information of the corresponding data field A in a byte unit.

Herein, the data field A is continuously inserted in the back of the data length field B.

Thereby, the RFID tag recognizes the size of the data field A from the data length field B of the content name field and reads the memory bank of the recognized data field A to search the content name data.

For example, when the fixed start address of the memory bank is '40h', the memory bank corresponding to '40h' stores the data length field B and the data field A subsequent to the back of the data length field B and including the content name data.

Herein, each content name data included in the data field A is stored in a character type formed by ASCII CODE.

For example, when the item attached with the RFID tag 100 is TV, the content name, such as 'SAMSONG_TV_LED', etc., is inserted and stored in the data field A. At this time, the content name is inserted and stored in each memory bank in the character type of 14 bytes such as 'S', 'A', 'M', 'S', 'O', 'N', 'G', 'T', 'V', 'E', 'D', etc. as ASCII CODE. The embodiment thereof is shown in FIG. 8.

At this time, each content name data having a most significant bit (MSB) is first stored.

When the content name field stored in the user memory bank is read by the RFID interrogator 200, the RFID interrogator 200 starts to read the data length field B. In other words, the RFID interrogator 200 reads the data of the memory bank whose start address is '40h' to recognize the length information of the content name field stored in the corresponding data length field B. Thereafter, the RFID interrogator 200 reads the memory bank by the recognized length to recognize the content name information from the content name data included in the data field.

Therefore, the RFID interrogator 200 recognizes the information related to the item attached with the corresponding RFID tag 100 according to the content name information recognized from the content name field that is stored in the user memory bank of the RFID tag 100 and receives the related contents through the corresponding ODS server 300 and the contents server 400.

Meanwhile, FIG. 7 is an exemplary diagram showing an example where the mobile RFID positional information is stored in the TID memory and in detail, an example where the start address information of the content name field in the tag list of the user memory bank is stored in the TID memory.

In FIG. 7, the content name field is inserted and stored in the memory bank having any address. At this time, in the content name field, the data length field B is first arranged and the content name field is inserted and stored in the memory bank having the next address, as in the embodiment of FIG. 6. At this time, the content name data included in the content name field is sequentially stored from 'content_name_0' to 'content_name_N'. At this time, the content name data having a most significant bit (MSB) is first stored.

However, in the embodiment of FIG. 7, the content name field is not stored in the memory bank having the fixed address and range, but is stored in the memory bank starting from any address.

Meanwhile, the tag that supports the mobile RFID content name field data in the user memory bank provides effective 32-bit mobile RFID address information in the TID memory. Herein, the structure of the content name address pointer stored in the TID memory refers to the embodiment of FIG. 9.

Herein, the mobile RFID address information indicates the start address and range information of the user memory bank stored in the content name field in the user memory.

The RFID tag 100 inserts and stores the start address of the content name field in the position having the fixed start address in the TID memory. At this time, the TID memory bank in which the address information of the content name field is stored performs a role as the content name address pointer.

At this time, the RFID tag transmits the address of the TID memory bank according to the read instruction from the RFID interrogator 200. Therefore, the RFID interrogator 200 accesses the TID memory based on the TID memory bank address from the RFID tag 100 and accesses the content name field based on the address information of the content name field stored in the content name address pointer of the TID memory.

In other words, as shown in FIG. 7, the fixed start address of the memory bank is '40h' and the start address of the user memory bank inserted with the content name field is '03Fh', the RFID tag 100 stores '03Fh', which is the start address of the user memory bank inserted with the content name field, in the field where the address of the TID memory is '40h'.

The RFID interrogator 200 reads from the TID memory the data of the memory bank whose start address is '40h' to confirm the position where the content name field is stored and reads the memory bank corresponding to the '03Fh' from the user memory. At this time, the RFID interrogator 200 reads the content name field stored in '03Fh' in the user memory and reads from 'content_name_0' to 'content_name_N' that is the content name data stored in the corresponding field.

Therefore, the RFID interrogator 200 recognizes the content name information related to the item attached with the corresponding RFID tag 100 from the content name field stored in the user memory bank of the RFID tag 100.

However, as in the embodiment shown in FIG. 7, when the address information of the content name field is separately stored in the TID memory, the access to the corresponding memory should be protected by a password. Therefore, the RFID tag 100 should first be in a 'Secured' state.

FIG. 8 shows the detailed embodiment of FIG. 7.

Referring to FIG. 8, the content name of the item attached with the corresponding RFID tag is 'NIKE_KOREA'. Therefore, the RFID tag 100 inserts each content name in the data field of the content name field using ASCII CODE such as 'N', 'I', 'K', 'E', '_', 'K', 'O', 'R', 'E', 'A'. At this time, the RFID tag 100 sequentially inserts the character from 'N' to 'A' in each memory bank and each memory bank is configured in a 2 bytes unit so that two characters are inserted in one memory bank.

Therefore, since all the characters inserted in the memory bank are 10 and thus becomes 10 bytes in total, the RFID tag 100 inserts and stores '0x0A(10 bytes)', which is the length information of the data field' in the data length field.

The embodiment of the process of inserting the content name field in the user memory bank is equally applied to the user memory bank shown in FIG. 7 and FIG. 6. FIGS. 6 and 7 have a difference only in the position of the user memory bank in which the content name field is inserted.

FIG. 9 is a table showing the structure of the content name address pointer stored in the TID memory of the RFID tag.

As shown in FIG. 9, among the mobile RFID address information stored in the TID memory, the size of the start address of the content name field stored in the user memory is 16 bytes. At this time, the size of each content name data included in the content name field, that is, the size of the data field A is stored in the data length field of the content name field in a byte unit.

Further, the range of the content name field among the RFID address information is 16 bytes (128 bits) at a maximum. Herein, the range of the content name field means the number of characters included in the corresponding field.

In order to insert the content name address pointer in the TID memory, two memory banks are assigned. First, the start address of the content name field is stored in the memory bank of the upper address. In more detail, the start address of the memory bank corresponding to the data length field among the content name field is stored.

The memory bank of the upper address is provided with 31:16 bits of a total of 32 bits, that is, a total of 16 bits. Therefore, the start pointer can be input between [15:0].

Meanwhile, the storage location in which the content name field is inserted and the presence, absence of the content name data in the corresponding content name field, etc. are stored in the memory bank of the lower address.

The present invention describes the embodiment of storing the content name field in the memory bank but is not limited to thereto. The storage location field is provided with 15:14 among a total of 32 bits, that is, 2 bits. Therefore, the storage location field can be input up to 2 bits between [1:0] such as 'MB', etc.

Whether there is the content name data is recorded in a 1 bit unit. At this time, when the content name data exists in the user memory, it is recorded in the corresponding field by '1'. At this time, when the content name data does not exist in the user memory, it is recorded in the corresponding field by '0'. The information recorded in the XPC_W1 is recorded in the XPC in the tag response later.

Other information, etc. can be stored in 12:0 that is the remaining space of the memory bank of the lower address, that is, a 13 bits field.

Next, a preferred embodiment of a method for exchanging information between the RFID interrogator 200 and the tag will be described according to the above description.

Figure 10:
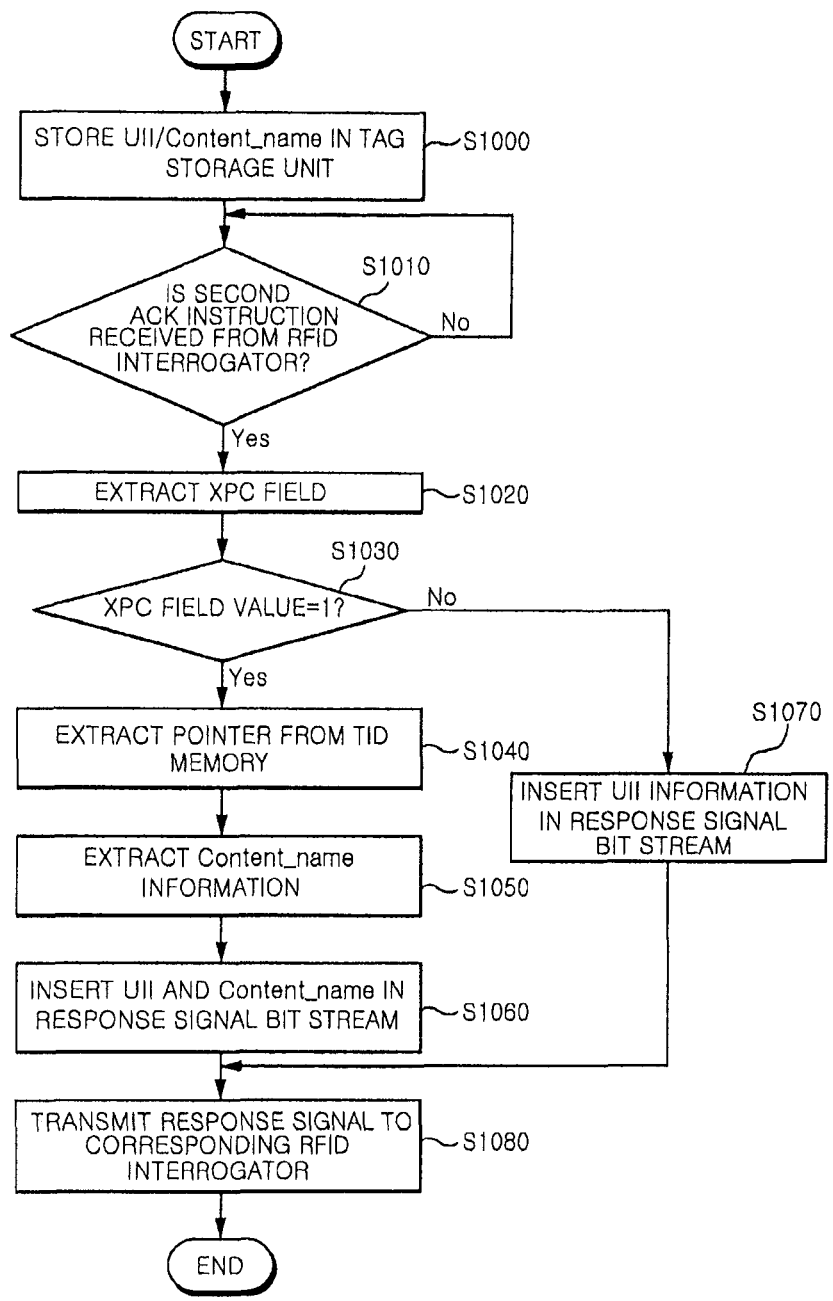
FIGS. 10 to 14 are flowcharts showing an operation flow of the RFID service method according to an exemplary embodiment.

FIG. 10 is a flowchart showing a process of providing the content name information of the RFID tag to the RFID interrogator according to the embodiment of the present invention and specifically, shows a process of inserting the content name information in the bit stream transmitted from the RFID tag to the RFID interrogator according to the second ACK instruction and providing it. The process shown in FIG. 10 is performed by the RFID tag 100.

Referring to FIG. 10, the RFID tag 100 stores the identification data (UII) for the item attached with the corresponding RFID tag 100 and the content name data related to the corresponding item in the user memory (S1000). Herein, the UII is stored in the EPC memory and the content name information is stored in the user memory bank. At this time, the RFID tag 100 extracts the XPC field and records the presence and absence of the content name field including the content name information (if so, '1' and if not, '0').

Next, when the second ACK instruction is received from the peripheral RFID interrogator 200 (S1010), the RFID tag 100 generates the response signal to the second ACK instruction and transmits it to the corresponding RFID interrogator 200 (S1020 to S1070). At this time, the tag 100 extracts the XPC field (S1020) and when the value is '1' (S1030), extracts the start address pointer of the content name field from the TID memory (S1040). Further, the RFID tag 100 extracts the UII stored in the EPC memory and the content name information stored in the user memory bank (S1050) and inserts the extracted UII and content name information in the bits stream of the response signal (S1060) and transmits it to the corresponding RFID interrogator 200 (S1080).

Meanwhile, when the value of the XPC field is '0' (S1030), the RFID tag 100 extracts the UII information stored in the EPC memory and inserts the extracted UII information in the bit stream of the response signal (S1070) and the transmits it to the corresponding RFID interrogator 200 (S1080).

The embodiment of the response signal of the RFID tag 100 in which the UII and the content name information are inserted refers to FIG. 5 described above.

Figure 11:
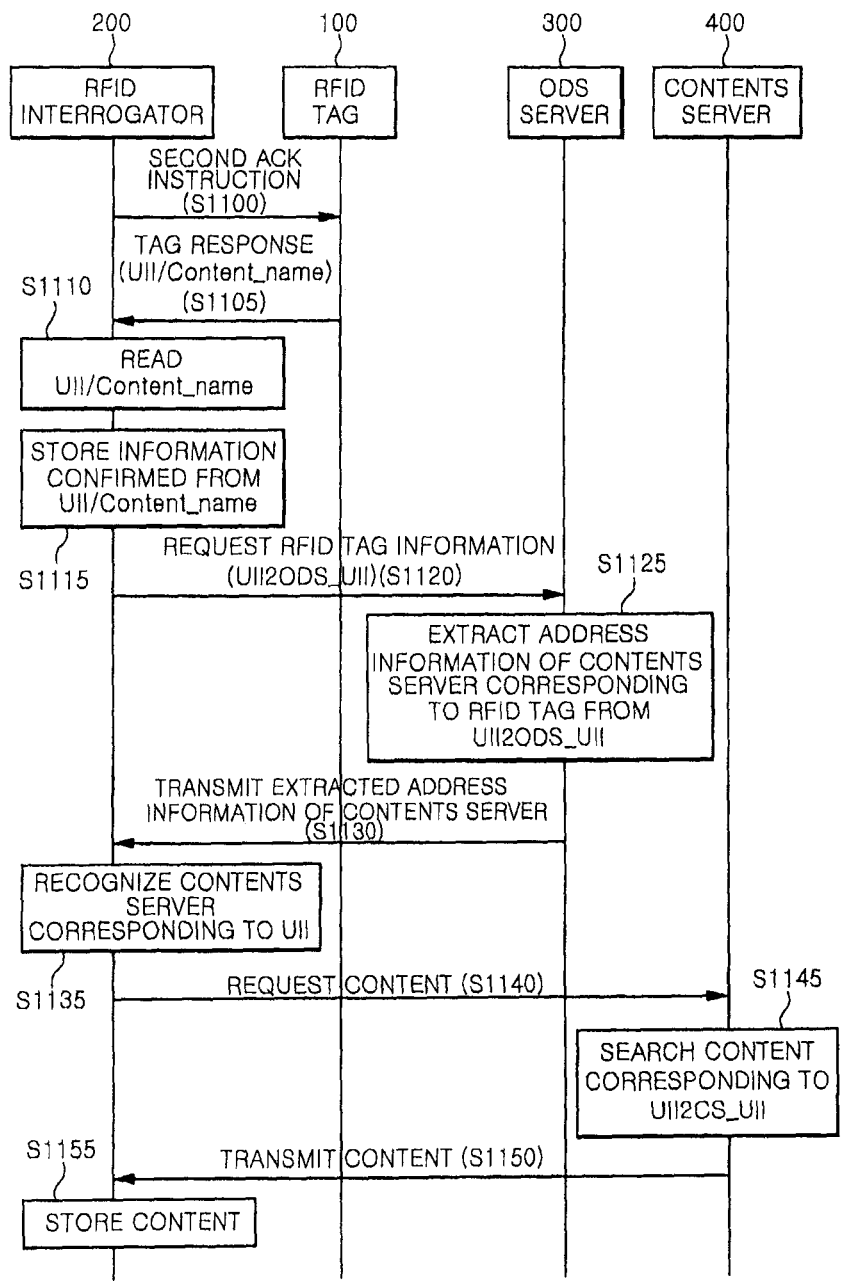

Meanwhile, FIG. 11 shows a process where the RFID interrogator obtains the contents related to the item attached with the RFID tag according to the execution of the process shown in FIG. 10.

Referring to FIG. 11, the RFID interrogator 200 transmits the second ACK instruction in the inventory process with the peripheral RFID tag 100 (S1100). At this time, the RFID interrogator 200 receives the response signal from the peripheral RFID tag 100 (S1105). At step 'S1105', the response signal of the received RFID tag 100 is identical with the response signal received from the RFID tag 100 at step 'S1040' of FIG. 10. The received response signal includes the identification data (UII) for the item attached with the corresponding RFID tag 100 and the data (name data) for the contents resource related to the corresponding item.

Therefore, the RFID interrogator 200 extracts and reads the UII and the content name data from the received tag response signal (S1110). The RFID interrogator 200 recognizes the information on the item attached with the corresponding RFID tag 100 from the UII and also recognizes the content name information on the item related to the corresponding RFID tag 100 from the content name data.

The confirmed information at step 'S1110' is stored in the storage unit 270 (S1115).

Thereafter, the RFID interrogator 200 requests the RFID tag information corresponding to the UII from ODS server 300, based on the confirmed information at step 'S1110' (S1120). At this time, the RFID tag information requesting signal transmitted to the ODS server 300 includes UII2IDS_UII that is the identification code for the UII.

The ODS server 300 extracts the address information of the contents server 400 corresponding to the UII2ODS_UII transmitted from the RFID interrogator 200 (S1125) and transmits the address information of the extracted contents server 400 to the corresponding RFID interrogator 200 (S1130).

Therefore, the RFID interrogator 200 recognizes the position of the contents server corresponding to the corresponding RFID tag 100 based on the address information of the contents server 400 provided from the ODS server 300 (S1135) and transmits the contents request signal including UII2CS_UII, which is the identification code for the UII, to the contents server 400 (S1140). At this time, the corresponding contents server 400 searches the contents corresponding to the UII2CS_UII in question according to the request of the RFID interrogator 200 (S1145) and transmits it to the RFID interrogator 200 (S1150). The RFID interrogator 200 stores the contents received from the contents server 400 in the storage unit 270 (S1155).

Figure 12:
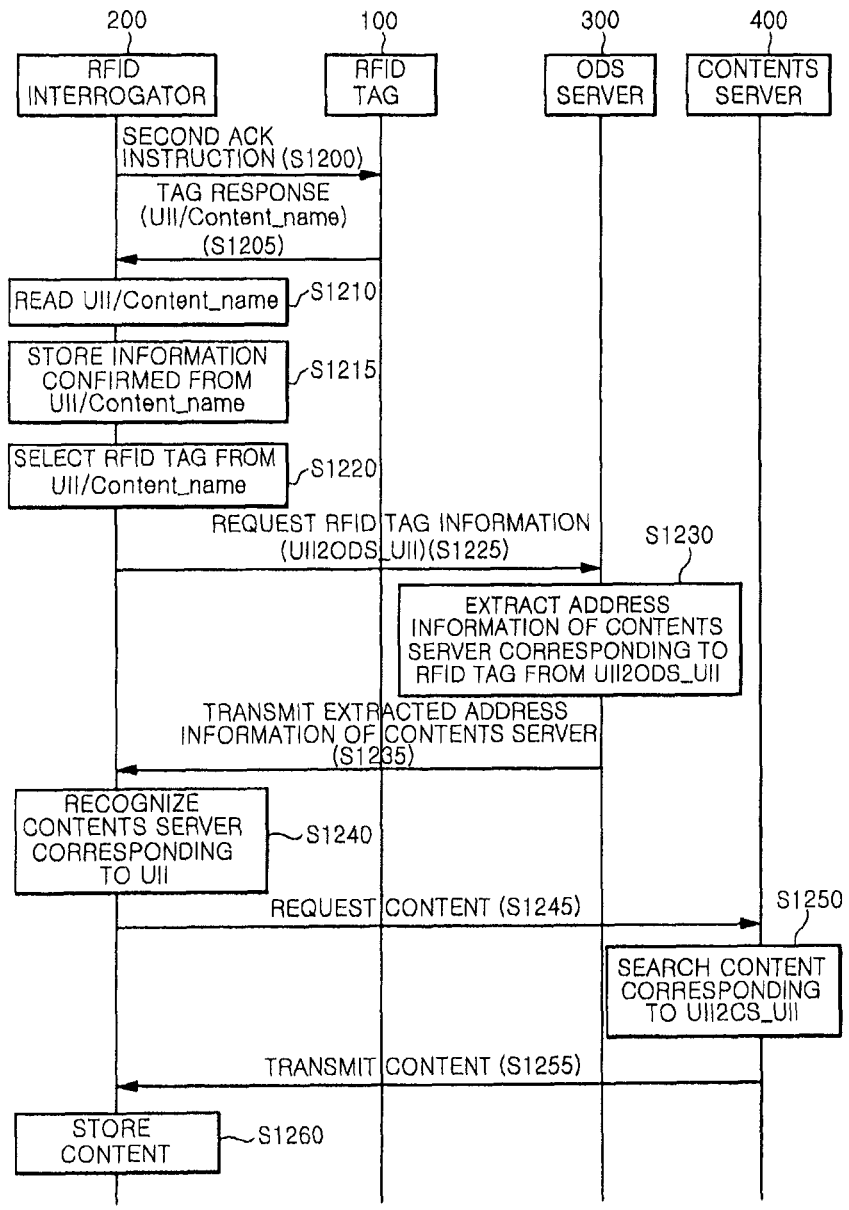

Meanwhile, FIG. 12 shows a process of performing the operation of FIG. 11 when the plurality of RFID tags are positioned in the RFID interrogator.

Referring to FIG. 12, steps 'S1200' to 'S1215' in FIG. 12 are identical with steps 'S1100' to 'S1115' of FIG. 1.

At this time, the RFID interrogator 200 receives the UII and the content name information from each of the plurality of tags. Therefore, the RFID interrogator 200 selects the RFID tag 100 corresponding to the specific content name based on the content name information provided from the plurality of tags (S1220).

Thereafter, the RFID interrogator 200 requests the RFID tag information corresponding to the UII from ODS server 300, based on the UII of the RFID tag 100 selected at step 'S1220' (S1225). At this time, the RFID tag information requesting signal transmitted to the ODS server 300 includes UII2ODS_UII that is the identification code for the UII.

The ODS server 300 extracts the address information of the contents server 400 corresponding to the UII2ODS_UII transmitted from the RFID interrogator 200 (S1230) and transmits the address information of the extracted contents server 400 to the corresponding RFID interrogator 200 (S1235).

At this time, the RFID tag information transmitted from the ODS server 300 to the RFID interrogator 200 includes the information on the contents server 400 that provides the related contents.

Therefore, the RFID interrogator 200 recognizes the position of the contents server 400 corresponding to the corresponding RFID tag 100 based on the address information of the contents server 400 provided from the ODS server 300 (S1240) and transmits the contents request signal including UII2CS_UII, which is the identification code for the UII, to the contents server 400 (S1245). At this time, the corresponding contents server 400 searches the contents corresponding to the UII2CS_UI in question according to the request of the RFID interrogator 200 (S1250) and transmits it to the RFID interrogator (S1255). The RFID interrogator 200 stores the contents received from the contents server 400 in the storage unit 270 (S1260).

Figure 13:
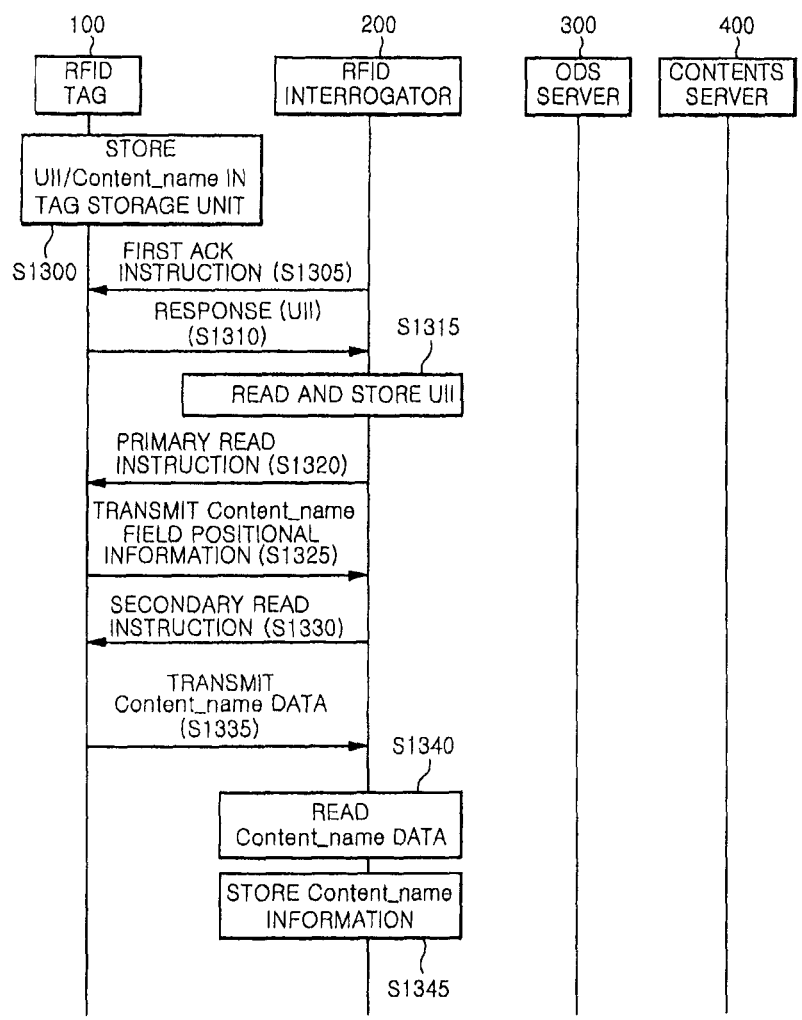
Figure 14:
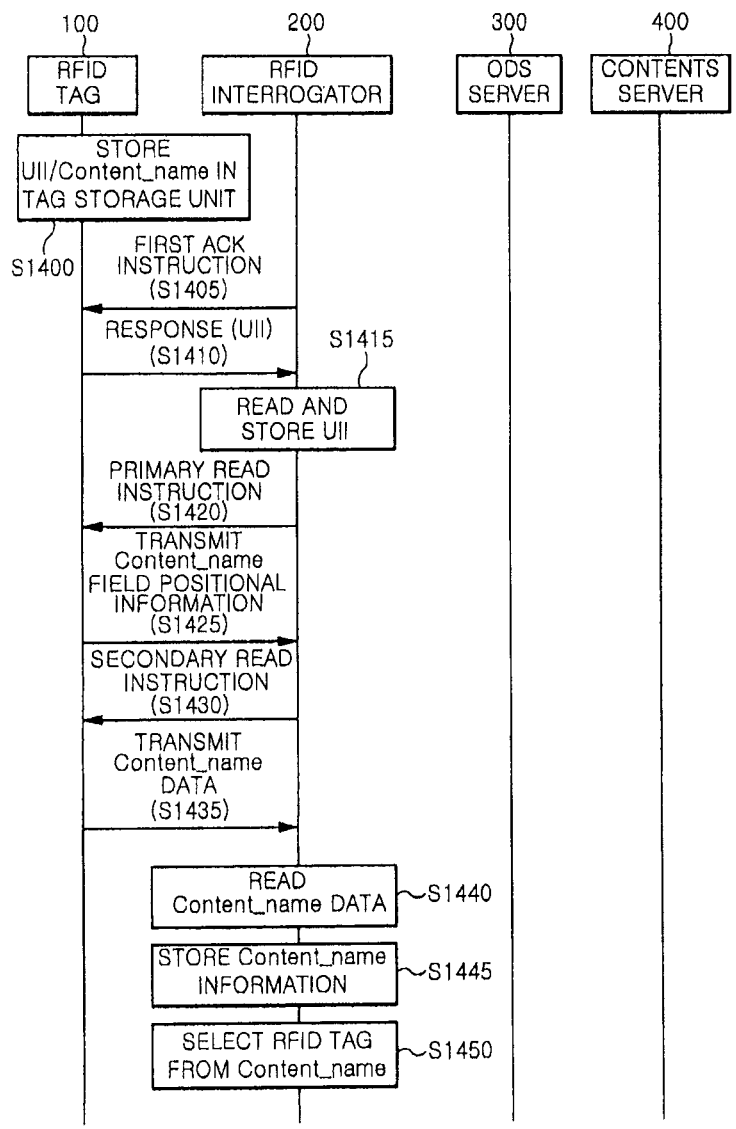

Meanwhile, FIGS. 13 and 14 shows processes of obtaining the related contents from the obtained information by accessing the RFID interrogator to the user memory of the RFID tag according to the embodiment of the present invention. In detail, FIGS. 13 and 14 show a process that the RFID interrogator searches the content name information stored in the user memory of the RFID tag to obtain the related contents from the confirmed information.

Referring first to FIG. 13, the RFID tag 100 stores the identification data (UII) for the item attached with the corresponding RFID tag 100 and the content name data related to the corresponding item in the tag storage unit 130 (S1300). In detail, the UII is stored in the EPC memory and the content name information is stored in the user memory.

Herein, when the RFID tag 100 inserts the content name field in the user memory bank, it can insert the content name field using the fixed memory address and range. Meanwhile, the RFID tag 100 inserts the content name field including the in the specific memory bank and can then record the positional information of the content name field in the tag ID memory (TID memory) in which the tag identification information is recorded. In this case, the positional information of the content name field is recorded in the memory bank having the fixed address in the TID memory.

When the content name field is inserted and stored in the user memory of the RFID tag 100 by one of the foregoing two methods, the RFID interrogator 200 accesses the user memory of the corresponding RFID tag 100, making it possible to search the related information.

The RFID interrogator 200 transmits the first ACK instruction to the peripheral RFID tag 100 (S1305). Further, the RFID interrogator 200 receives the response signal to the first ACK instruction from the peripheral RFID tag 100 (S1310). At this time, the RFID interrogator 200 reads and stores the UII information included in the response signal (S1315).

Thereafter, the RFID interrogator 200 transmits a primary read instruction to the peripheral RFID tag 100 (S1320). Therefore, the RFID interrogator 200 receives information necessary to access the user memory of the RFID tag 100, that is, the fixed address information of the memory bank in which the content name field is inserted, the address information of the TID memory bank in which the start pointer of the content name field is stored, etc. (S1325).

The RFID interrogator 200 accesses the RFID tag 100 based on the information provided from the RFID tag 100. At this time, the RFID interrogator 200 accesses the content name field through the fixed address of the user memory bank or accesses the content name field in the user memory through the address of the user memory bank confirmed from the TID memory. The RFID interrogator 200 transmits a secondary read instruction to the RFID tag 100 to request the content name data (S1330).

Therefore, the RFID tag 100 transmits the content name data stored in the user memory bank to the RFID interrogator 200 according to the secondary read instruction (S1335).

The RFID interrogator 200 calls the content name data included in the content name field (S1340) and reads the content name data called from the RFID tag 100 (S1340). The confirmed content name information at step 'S1355' is stored in the storage unit 270 (S1345).

Thereafter, the RFID interrogator 200 requests the RFID tag information corresponding to the UII from ODS server 300, based on the confirmed information at step 'S1340' (S1120), likewise FIG. 11. At this time, the RFID tag information requesting signal transmitted to the ODS server 300 includes UII2ODS_UII that is the identification code for the UII.

The ODS server 300 extracts the address information of the contents server 400 corresponding to the UII2ODS_UII transmitted from the RFID interrogator 200 (S1125) and transmits the address information of the extracted contents server 400 to the corresponding RFID interrogator 200 (S1130).

At this time, the RFID tag information transmitted from the ODS server 300 to the RFID interrogator 200 includes the information on the contents server 400 that provides the related contents.

Therefore, the RFID interrogator 200 recognizes the information on the contents server corresponding to the corresponding RFID tag 100 based on the address information of the contents server 400 provided from the ODS server 300 (S1135) and transmits the contents request signal including UII2CS_UII, which is the identification code for the UII, to the corresponding contents server 400 (S1140). At this time, the corresponding contents server 400 searches the contents corresponding to the UII2CS_UII in question according to the request of the RFID interrogator 200 (S1145) and transmits it to the RFID interrogator (S1150). The RFID interrogator 200 stores the contents received from the contents server 400 in the storage unit 270 (S1155).

In FIG. 13, steps subsequent to step 'S1355' are identical with FIG. 11 and therefore, are omitted in FIG. 13.

Meanwhile, FIG. 14 shows a process of performing the operation of FIG. 13 when the plurality of RFID tags are positioned in the RFID interrogator.

Referring to FIG. 14, steps 'S1400' to 'S1460' in FIG. 14 are identical with steps 'S1300' to 'S1345' of FIG. 13.

At this time, the RFID interrogator 200 receives the UII and the content name information from each of the plurality of tags. Therefore, the RFID interrogator 200 selects the RFID tag 100 corresponding to the specific content name based on the content name information provided from the plurality of tags (S1450).

Thereafter, the RFID interrogator 200 requests the RFID tag information corresponding to the UII from ODS server 300, based on the UII of the RFID tag 100 selected at step 'S1450' (S1225). At this time, the RFID tag information requesting signal transmitted to the ODS server 300 includes UII2ODS_UII that is the identification code for the UII.

The ODS server 300 extracts the address information of the contents server 400 corresponding to the UII2ODS_UII transmitted from the RFID interrogator 200 (S1230) and transmits the address information of the extracted contents server 400 to the corresponding RFID interrogator 200 (S1235).

At this time, the RFID tag information transmitted from the ODS server 300 to the RFID interrogator 200 includes the address information on the contents server 400 that provides the related contents.

Therefore, the RFID interrogator 200 recognizes the information on the contents server 400 corresponding to the corresponding RFID tag 100 based on the address information of the contents server 400 provided from the ODS server 300 (S1240) and transmits the contents request signal including UII2CS_UII, which is the identification code for the UII, to the corresponding contents server 400 (S1245). At this time, the corresponding contents server 400 searches the contents corresponding to the UII in question according to the request of the RFID interrogator 200 (S1250) and transmits it to the RFID interrogator (S1255). The RFID interrogator 200 stores the contents received from the contents server 400 in the storage unit 270 (S1260).

In FIG. 14, steps subsequent to step 'S1450' are identical with FIG. 12 and therefore, are omitted in FIG. 14.

As described above, the RFID tag for the RFID service and the RFID service method according to the present invention is not limited to the configuration and method of the embodiments described as above, but the embodiments may be configured by selectively combining all the embodiments or some of the embodiments so that various modifications can be made.

The invention claimed is:

1. An RFID tag for an RFID service, comprising:
    a user memory that stores a content name field, the content name field including content name information of an item to which the RFID tag is attached; and
    a Tag-ID (TID) memory that stores positional information in an area of the TID memory, the positional information includes a start address of the content name field that is stored in the user memory, and
    wherein the RFID tag provides a response signal generated to contain the content name field corresponding to an UII (Unique Item Identifier) identifying the item, and the UII, according to a request of an RFID reader,
    wherein the RFID reader identifies the item to which the RFID tag is attached using the UII contained in the response signal, and sends a request corresponding with the item as identified,
    the response signal comprises a PC (Protocol Control) field for recording protocol control information, an XPC (eXtended Protocol Control) field for recording extended protocol control information, a UII field for recording the UII and the content name field for recording the content name information,
    wherein the content name field of the response signal is inserted subsequent to the UII field, and
    wherein the positional information includes 2-bits for representing memory bank (MB).

2. The RFID tag for the RFID service according to claim 1, wherein the content name field is provided in the XPC field.

3. The RFID tag for the RFID service according to claim 1, wherein the content name field in the user memory includes a data field in which content name data is stored and a data length field in which length information is stored in bytes.

4. The RFID tag for the RFID service according to claim 3, wherein the data field is continuously inserted subsequent to the data length field.

5. An RFID service method of an RFID tag, comprising:
storing a content name field in a user memory, the content name field including content name information of an item to which the RFID tag is attached; and
providing a response signal to an RFID reader, the response signal generated to contain the content name field corresponding to an UII (Unique Item Identifier) identifying the item, and the UII, according to a request from the RFID reader, and
wherein the RFID reader identifies the item to which the RFID tag is attached using the UII contained in the response signal, and sends a request corresponding with the item as identified,
the response signal comprises a PC (Protocol Control) field for recording protocol control information, an XPC (eXtended Protocol Control) field for recording extended protocol control information, a UII field for recording the UII and the content name field for recording the content name information,
the content name field of the response signal is inserted subsequent to the UII field,
a Taq-ID (TID) memory stores positional information including a start address of the content name field that is stored in the user memory, and
wherein the positional information includes 2-bits for representing memory bank (MB).

6. The RFID service method of the RFID tag according to claim 5, wherein content name field is provided in the XPC field.

7. The RFID service method of the RFID tag according to claim 5, further comprising positional information is stored in an area of the TID memory, and the positional information includes a start address of the content name field that is stored in the user memory.

8. The RFID service method of the RFID tag according to claim 5, wherein the content name field in the user memory includes a data field in which content name data is stored and a data length field in which length information is stored in bytes.

9. The RFID service method of the RFID tag according to claim 8, wherein the data field is continuously inserted subsequent to the data length field.

\* \* \* \* \*